US007264763B2

(12) United States Patent
von Haas et al.

(10) Patent No.: US 7,264,763 B2
(45) Date of Patent: Sep. 4, 2007

(54) METHOD AND APPARATUS FOR THE MANUFACTURE OF COMPACTS

(75) Inventors: Gernot von Haas, Leimen (DE); Detlef Kroll, Eppingen (DE)

(73) Assignee: Dieffenbacher GmbH + Co. KG, Eppingen (DE)

( * ) Notice: Subject to any disclaimer, the term of this patent is extended or adjusted under 35 U.S.C. 154(b) by 216 days.

(21) Appl. No.: 10/847,668

(22) Filed: May 18, 2004

(65) Prior Publication Data

US 2005/0156347 A1 Jul. 21, 2005

(30) Foreign Application Priority Data

May 18, 2003 (DE) ................................ 103 22 228

(51) Int. Cl.
*B29C 43/04* (2006.01)

(52) U.S. Cl. ...................... 264/517; 264/109; 264/115; 264/123; 425/347; 425/350; 425/351; 44/596; 44/597; 44/636

(58) Field of Classification Search ..................... None
See application file for complete search history.

(56) References Cited

U.S. PATENT DOCUMENTS 689,015 A * 12/1901 McNaught .................. 425/351
3,743,462 A 7/1973 Alessio
4,802,836 A * 2/1989 Whissell ...................... 425/253
5,662,849 A * 9/1997 Bogue et al. ............... 264/112
6,899,839 B2 * 5/2005 Fifield ......................... 264/109

FOREIGN PATENT DOCUMENTS

| | | |
|---|---|---|
| DE | 42362 | 5/1887 |
| DE | 224277 | 8/1908 |
| DE | 26 00 648 A1 | 7/1976 |
| DE | 19535315 | 3/1997 |
| DE | 199 55 844 A1 | 5/2000 |
| DE | 10049050 | 4/2002 |
| EP | 0216388 | 4/1987 |
| EP | 0247285 | 12/1987 |
| EP | 0691121 | 1/1996 |
| GB | 2124544 | 2/1984 |
| WO | WO 96/26053 | 2/1995 |

* cited by examiner

*Primary Examiner*—Mary Lynn Theisen
(74) *Attorney, Agent, or Firm*—Foley & Lardner LLP

(57) ABSTRACT

A method for the manufacture of compacts from comminuted material (12) such as lignocellulose material and/or other combustible material for burning in hearths, wherein the material (12) is placed into openings (11) of a mold (4) and then compressed to form compacts. The filling of a mold (4) with the material (12) and the compaction of the material (10) to form compacts (10) is performed in the pressing chamber (18) of a multi-platen press (1) with plungers (7) plunging into many openings (11) of a mold (4), and after compaction the mold (4) with the ram (3) is raised and additionally urged against the ram, while the finished compacts are driven out of the mold and then are pushed out of the press chamber (18) into a container (16) by an ejecting device. Moreover, an installation for the practice of the method includes a hopper (9) and a multi-platen press (1) with a mold raising-and-lowering device (14).

29 Claims, 3 Drawing Sheets

METHOD AND APPARATUS FOR THE MANUFACTURE OF COMPACTS

CROSS-REFERENCE TO RELATED PATENT APPLICATIONS

Germany Priority Application DE 10322228.6, filed May 18, 2003 including the specification, drawings, claims and abstract, is incorporated herein by reference in its entirety.

BACKGROUND OF THE INVENTION

The invention relates to methods for the manufacture of compacts from comminuted material such as lignocellulose material and/or other combustible material, an apparatus for practicing the methods, and to a multi-platen press for the apparatus.

DE 199 55 844 A1, from which the invention sets out and which is incorporated here by reference, relates to a method and a press for the manufacture of pellets. Accordingly, pellets for heating purposes consist of compressed biomass, such as sawdust and/or planer chips, the starting material being able to contain also wheat and corn in ground form or starch in the amount of 1 to 10 weight-percent which is added to the mixture as lubricant and binder. The corresponding press is a ring or flat die press with, pug rolls which in the circuit force the material through the openings in a hole plate and thus produce pellets or compacts.

Such wood pellets have diameters of 4 to 10 mm and are shorter than 50 mm. Wood briquettes have different shapes, the diameter being 20 mm. Both are compacts with a density greater than 1000 kg/m$^3$, preferably greater than 1200 kg/m$^3$. They are used for heating in hearths, special combustion stoves and other hearths and are appropriate due to their free-flowing quality for automatic firing. The material, for the manufacture of the compacts can also be made of materials other than those containing lignocellulose, as for example annual plants (e.g., straw, bagasse, . . . ), palms, peat or certain types of brown coal, or mixtures of various materials containing lignocellulose. For the disposal of plastics (e.g., thermosetting plastics), 5% to 50% of such waste can, be admixed with the lignocellulose material. On the other hand the exhaust gases produced by burning must of course be especially filtered. In the case of pellet and briquette production, the starting material is generally comminuted materials in the form of chips.

Pursuant to DE 26 00 648 C2 and U.S. Pat. No. 3,743,462, which are incorporated here by reference, the ground material are forced by means of rolls through a hole plate. In the case of wood briquetting, extrusion presses are used as a rule. Pellet presses and extruders have the disadvantage that the capacity per machine is limited to a maximum of 3 metric tons per hour. In the case of pelletizing, an adhesive such as starch, for example, must be added in an amount of up to 2% of the dry wood mass, since the compaction achieved of up to 1300 kg/m$^3$ is not enough to achieve sufficient strength without binding agent. Furthermore, the electric power consumption is relatively great and uneconomical. Theoretically, ordinary chipboards can be made, cut up in continuous twin-belt presses or single or multiple stage presses and used as fuel. But when the chip boards are cutup with saws, sawdust is produced and the minimum saw kerf amounts to about 3 mm. The compact is thus not round and therefore it is relatively unsuitable for automatic stoking. Also, in the case of chips 10 mm thick, 15% sawdust is produced. Any accurate cutting of the high-density compact is likewise difficult.

SUMMARY OF THE INVENTION

The invention is addressed to the problem of creating a method and an apparatus of great capacity for the production of round compacts which, after pressing, no longer need to be divided up and have a density of up to 1500 kg/m$^3$.

The solution of this problem consists, according to one embodiment, in that the filling of a mold with ground material and their compaction into compacts is performed in the press chamber of a multi-stage press with plungers descending into many openings in a mold, and that after compaction the compact is raised with the ram and additionally raised against the ram, the finished compacts being thus ejected from the mold and then pushed out of the press chamber into a container by means of an ejecting device.

A second solution consists, according to another preferred embodiment, in compressing the ground material to form compacts in the press chamber of a single-stage press with plungers entering a mold filled with the ground material; after compaction, the plungers are raised up out of the mold with the press ram and the mold is removed from the press chamber, the finished compacts are forced out of the openings and, after refilling, the mold is returned into the press chamber for the next compaction cycle.

An apparatus for the practice of the method consists, according to yet another preferred embodiment, of a filling system and a multi-stage press, between which there is an apparatus for shifting the mold in and out; the mold has many openings to receive the ground material and the multi-stage press has press frames with a pressing table arranged within it and a ram which, can be raised and lowered, by means of hydraulic piston-and-cylinder systems, and plungers are provided on the press ram for all of the openings in the mold.

Additional advantageous measures and embodiments of the subject matter of the invention will appear from the claims and the following description and drawings.

DETAILED DESCRIPTION OF THE PREFERRED EMBODIMENTS

Figure 1:
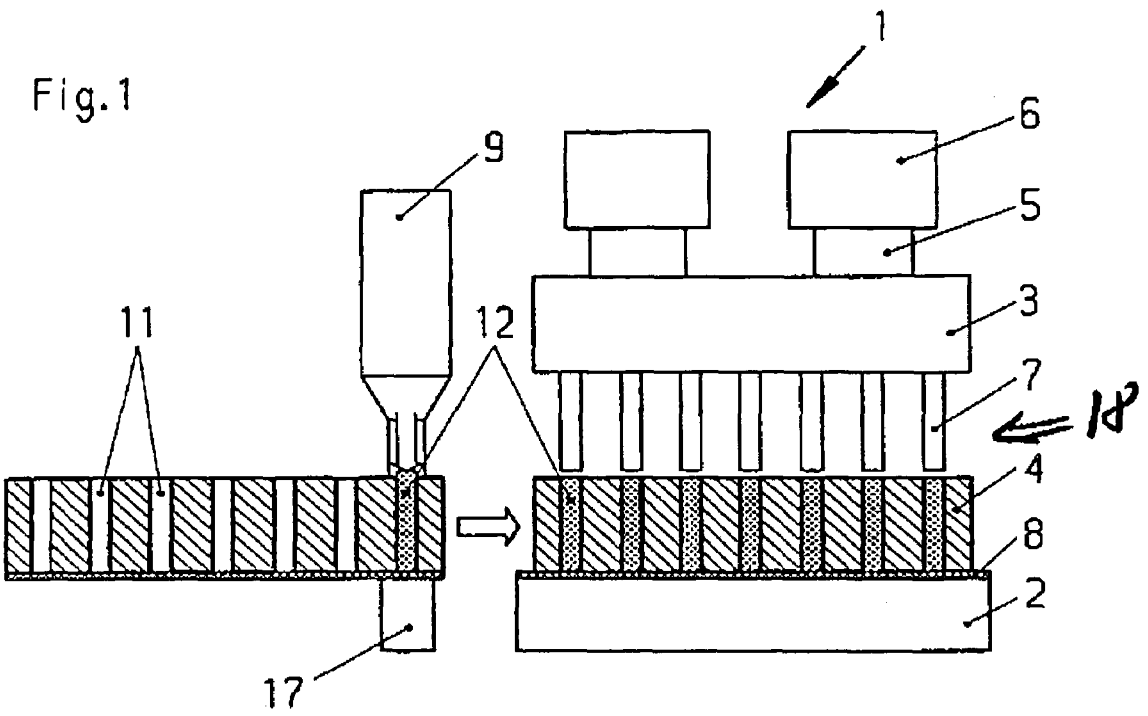
FIG. 1 shows a side view of the apparatus and multi-platen press according to the invention and a sectional view of the mold filed with the ground material, FIG. 2 the multi-platen press of FIG. 1 while it is being filled with the ground material, FIG. 3 the multi-platen press of FIG. 2 with the mold raising and lowering device, FIG. 4 the multi-platen press of FIG. 3 with the mold raised and the compacts ejected, and FIG. 5 the apparatus of FIG. 1 with two molds.

By the method of the invention, comminuted material, containing lignocellulose as a rule, is loaded into a flat mold having openings or bores, the bores corresponding to the diameter of the compact and extending all the way through perpendicular to the surface of the mold. The mold can consist of metal and has approximately the thickness resulting from the bulk weight of the ground material and the length and density of the compacts. For example, in the case of wood chips with a bulk weight of 250 kg/m$^3$ and a compact length of 30 mm, the thickness of the mold is 140 mm. In a cyclically operated flat press, the chips that are strewn into the mold are compressed with a plurality of plungers and, when the mold is removed from the press, the compacts are forced out of the mold. Before or during compaction, steam can be introduced into the bores from one side, preferably at the bottom, in order to heat and moisten the compacts.

The lignocellulose material can be supplied with varying moisture content and shape. As a rule, in the case of material of excessive dimensions, first it is comminuted with an appropriate device (mill, refiner, worm, chopper, etc.). Preferably the comminution is performed such that 95% of all particles would drop through a sieve with mesh sizes of 1.5 mm.

In the case of forest waste, palms, turf, brown coal, or annual plants such as straw, the moisture can vary between 8 and 200% depending on when it was harvested and the time elapsed since it was harvested or mined. If already-used lignocellulose material is used, such as recycled wood or waste paper, the moisture is usually less than 20%, often only 5%. To carry on the process economically, it is recommendable to perform a separate beneficiation according to the moisture content. If much of the lignocellulose material has a moisture above 120%, a drying or preliminary drying operation can be performed, or the drying is performed after the material is in the compacted form.

According to the invention, there are three examples or different possibilities for controlling the moisture and temperature before and during the production of the compacts, the choice of the method depending on the moisture content of the ground material upon delivery to the factory and according to the pelletizability of the material to be processed.

EXAMPLE A

Using Dried Material and Compaction at More Than 90° C.

In case a lignocellulose material is used with various moisture contents of 5%-180%, if the lignocellulose material has moisture contents above 20%, first the material must be dried to moisture contents below 20%, preferably to 10%. Drum or pneumatic conveyor dryers are used, for example.

The material dried in the factory and the material delivered already dry is then steamed in a mixer or other container before it is placed in the mold. Steaming serves several purposes. On the one hand the temperature of the particles is raised to 80° C. and higher. On the other hand the steam condenses on the particle surface, which results in moistening. This is especially important in the case of particles having a moisture content below 5%. If particles are used which have a wax coating on the surface—such as straw, for example—the wax coating is softened by the steam and then it is removed from the surface even by slight mechanical friction, thereby increasing bondability. If starch is added to the particles, the starch is softened by the condensate from the steam and later is rendered more adhesive thereby. The moisturizing produced by the steaming amounts to between 2% and 5% depending on the temperature of the particles.

After the ground material are spread into the mold they can be tamped down and pressed. The process must be so conducted that the particles are sufficiently adhered together afterward, if possible without the addition of adhesives. This is achieved in lignocellulose particles when subjected during compaction to a temperature of 90° C. or more, in combination with more than 5% moisture. Then the lignin and hemicellulose soften and become tacky. The particles can develop very close contact surfaces due to softening. Thus hydrogen bridge bonds can form, among others. It has therefore proven advantageous, especially when no predampening has been performed or the temperature has dropped too rapidly from predampening to compaction, to introduce steam into the bores in the mold during the operation of compaction.

EXAMPLE B

Use of Dried Material and Compressing at Room Temperature 10-50° C.

In an additional embodiment of the invention the surface temperature of the particles during compaction can he below 90° C., preferably ambient temperature. The moisture of the particles prior to spreading must be less than 20%. In this case, however, binding agents or agglomeration adjuvants must be added to the particles, such as slaked lime, starch, gypsum, pine resins, etc. The press pressure is definitely greater. Dampening prior to spreading can be advantageous in this case, if starch, for example, is used. The mold and the upper platens are not heated, so that the installation technology is very simple. The apparatus can be designed without any heating.

EXAMPLE C

Use of Moist Material or Only Pre-Dried Material, and Hot Pressing

If a great part of the lignocellulose material is delivered with moisture content above 20%, the compaction can be performed even without any separate drying of the particles at the factory. The drying of the particles is performed in the mold before or during compaction. A prior dampening before spreading can likewise he performed in order to activate binding agents. The drying of the particles in the mold is performed preferably by introducing hot air into the bores in the mold. The drying, however, can also he accomplished by merely warming the particles in the mold to over 100° C. For that purpose the mold must have a temperature above 100° C. and preferably above 150° C. before the particles are spread. As a special development of this variant, in the case of particles with moisture above 120%, first part of the water is pressed out mechanically, so that the particles have a moisture of 30-40% before any further drying. For this purpose, first steam (saturated steam or superheated steam) with a temperature of 100-200° C. is introduced; then the material is compressed or water is wrung out, and then it is further dried by introducing hot air or by conduction only, and finally it is compressed to the final density. Thus a considerably better thermal energy balance can be achieved.

To sum up the procedure for Example C, it consists in

Spreading into a mold with a temperature above 100° C., loading the heated platen press with this heated mold (press plate heated 60 100-270° C.)

Introduction, possibly before at the start of the compaction, of hot air or air-conditioned hot air into the openings in the mold, and then Compaction until the compacts have a moisture under 15%, preferably 6%, after compaction; before the targeted crude compact density is reached, i.e., before the final compaction, it is recommendable to stop the drying. The advantage of this method is that very little or no binding agent has to be used and that a separate dryer is not necessary.

As a result, by the method of the invention, using a multi-platen press (length 20 m, width 2 m), about 50 t/h of pellets are produced with a diameter of 8 mm and a length of 50 mm at a cycling period of 1 pressing per minute. This signifies an enormous technical advance over the known state of the art.

Also to be mentioned are these advantages of this method: Since a higher pressure can, be applied, the pellet density can be set higher. This also results in better resistance to attrition and better baking. Less or even no adhesive needs to be used, with increasing density of the pellets. With the possibility of establishing an optimum combination of moisture and temperature during the pressing operation, while at the same time establishing the duration of the temperature and exposure to moisture according to the desired properties, the addition of adhesive can likewise be minimized and the resistance of the pellets to attrition is thereby improved. Also, lignocellulose materials which are difficult to pelletize, such as straw, can thereby be pelletized.

While in the case of the known pellet presses and extrusion presses the length of the compacts cannot be definitely set, the possibility exists in the methods of the invention to produce compacts with exact dimensions also in length, and their shape can be determined advantageously especially for burning.

Figure 2:
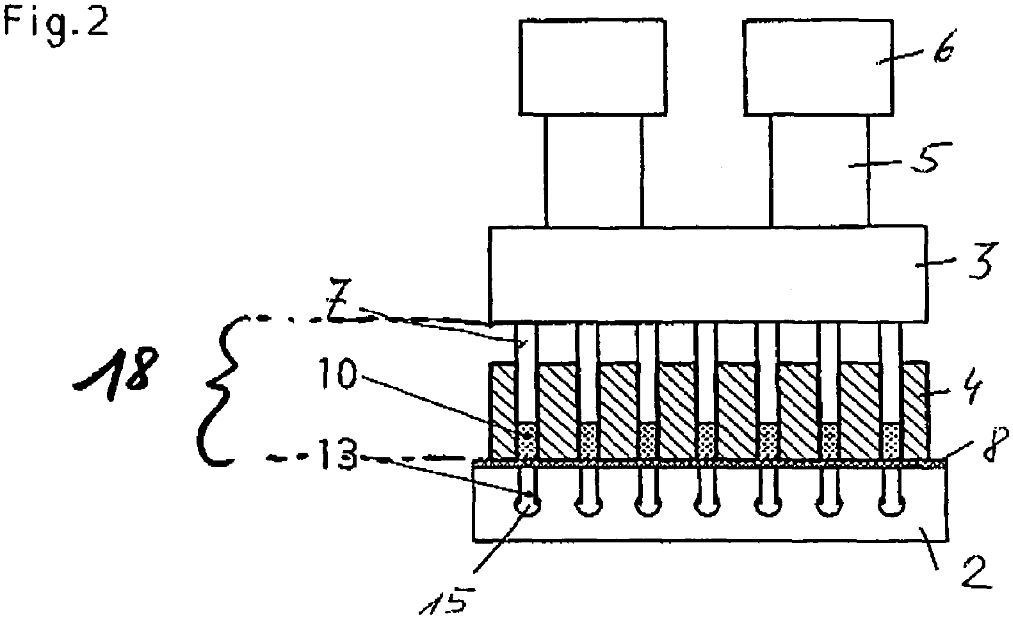
Figure 3:
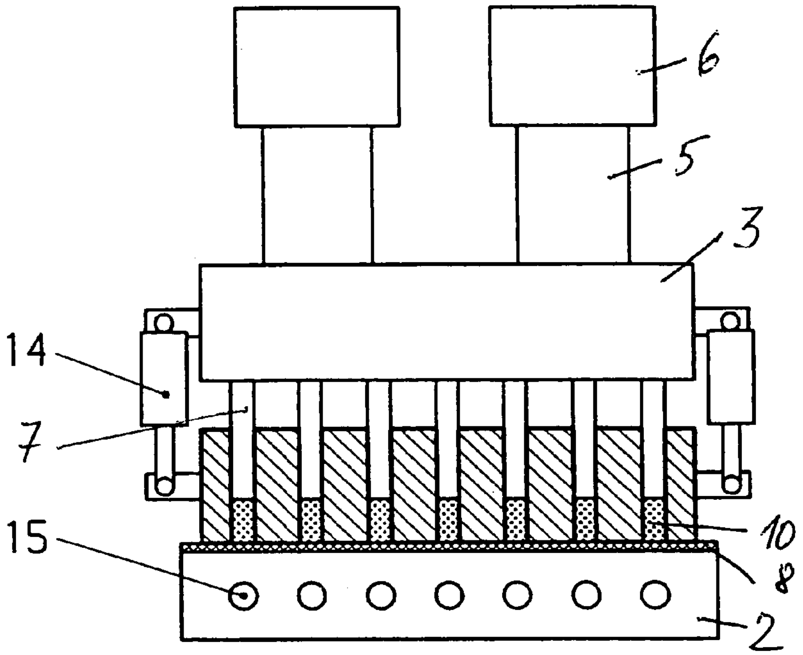
Figure 4:
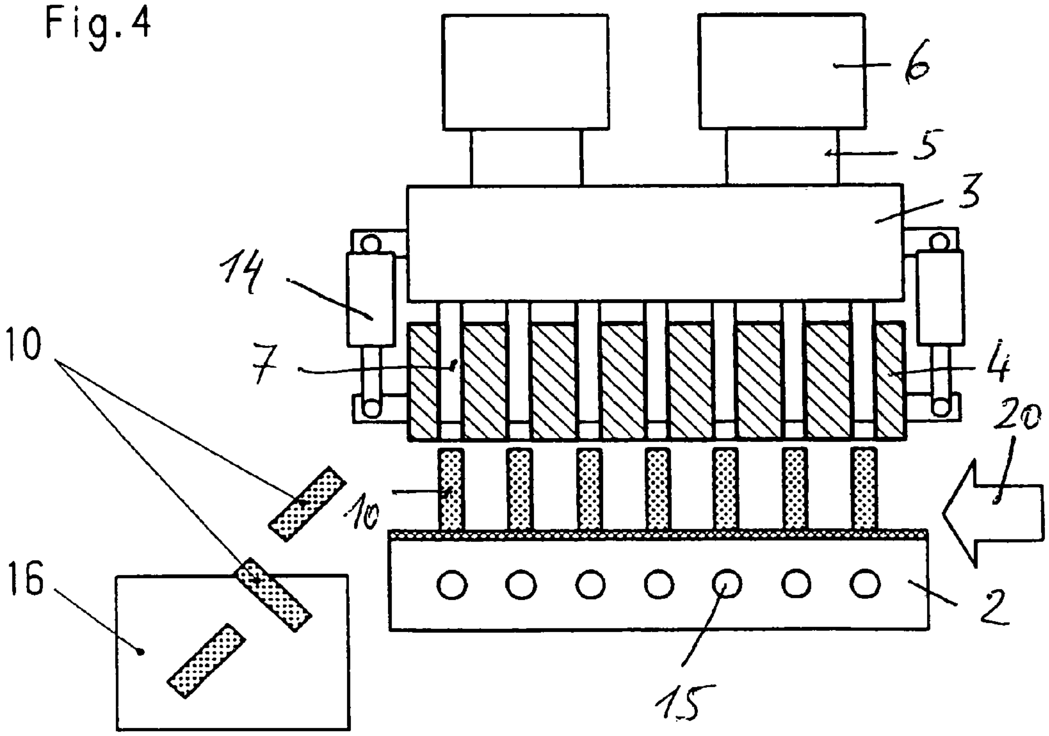
Figure 5:
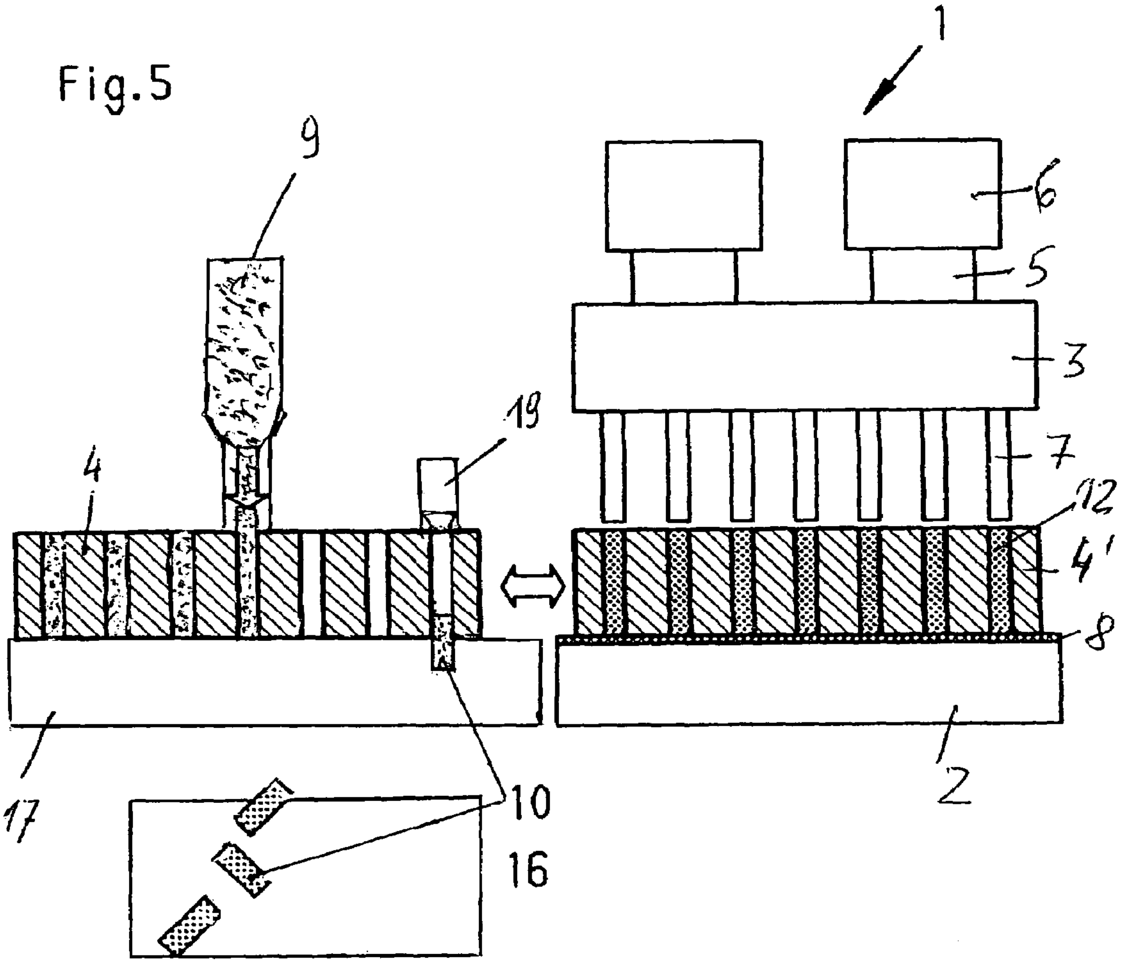

The drawing shows in FIGS. 1 to 5 three apparatus for the practice of the method of the invention. FIGS. 1, 2 and 5 show the apparatus for filling the mold 4 and molds 4 and 4' with ground material 12 outside of the multi-platen press 1 with the hopper 9, while in FIGS. 3 and 4 the filling of the openings 11 in the mold 4 with ground material 12 is provided within the press chamber 18. The mold 4, and molds 4 and 4' respectively, are made so as to be inserted with an inserting and removing apparatus (not shown) in the press chamber 18 and on the platen 17, the apparatus in FIG. 5 being equipped with two molds 4 and 4' which can be inserted and removed together. Accordingly, on the left ahead of the multi-platen press 1 the compacts 10 have already been ejected serially (across the width) into a container while being removed from the press chamber 18, and then the cavities 11 are filled with ground material 12 by the filling system 9. In the next compaction cycle, however, the ejection and filling are performed on the right, ahead of the multi-platen press 1. For the sake of simplicity the mirror-image identical configuration of the ejection and filling on the right of the press 1 is not shown. Ejection with the ejection device 19 can be performed either mechanically with rams or with compressed air or a vacuum. Where the apparatus is configured with two molds 4 and 4' in FIG. 5, it is a great advantage that the ejection of compacts 10 per unit of time is substantially greater.

The multi-platen press 1 for the apparatus for the practice of the method includes a press frame (not shown) with press table 2 arranged therein and the ram 3 which can be raised and lowered by hydraulic cylinders 6 and pistons 5 as well as the plungers 7 mounted in the mold 4 in the same number as the openings 11 in the mold 4.

FIGS. 1 and 2 show the attachment of supply lines 13 of passages 15 of the press table 2 to the openings 11 along the length of the mold 4 to supply steam or vacuum to the openings 11. To bring steam or vacuum into the openings 11 between the longitudinal sides, a screen 8 is placed between the press table 2 and the mold 4. As FIG. 4 furthermore shows, the mold 4 is additionally raised to the ram 3 by mold raising and lowering device 14, and the compacts 10 are thus ejected onto the press table 2 by the plungers 7. Then the compacts 10 are pushed by a pushing device 20 into the containers 16.

Preferred Embodiments

A. Method for the manufacture of compacts from comminuted material (12), such as lignocellulose material and/or other combustible material for burning in hearths, wherein the ground material (12) are put into openings (11) of a mold (4) and compressed therein to form compacts (10), characterized in that the filling of a mold (4) with the ground material (12) and the compaction of the ground material (12) into compacts (10) in the press chamber (18) of a multi-platen press (1) is performed with plungers (7) plunging into many openings (11) of a press mold (4), and that after the compaction the mold (4) with the ram (3) is raised and lifted up additionally against the ram, while the finished compacts (10) are ejected from the press chamber (18) into a container (16) by means of an ejecting device.

B. Method according to embodiment A, characterized in that the openings (11) of the mold (4) are filled with ground material outside of the multi-platen press and then the mold (4) is moved into the press chamber (18).

C. Method for the manufacture of compacts from comminuted material such as lignocellulose material and/or other combustible material for burning in hearths, wherein the ground material (12) are put into openings (11) of a mold (4) and compressed therein to form compacts (10), characterized in that the compaction of the ground material (12) to compacts (10) is performed in the chamber (18) of a multi-platen press (1) with plungers (7) plunging into many openings (11) of a mold (4) filled with ground material, after the compaction the plungers (7), are lifted out of the mold (4) with the ram (3) and the mold (4) is carried out of the press chamber (18), the compacts are forced out of the openings (11) and after the mold (4) is refilled for the next compaction cycle it is carried into the press chamber (18).

D. Method according to embodiments A to C, characterized in that the compaction of the ground material (12) in the multi-platen press (1) on the one hand, and the ejection of the compacts (10) as well as the refilling on the other hand, are performed simultaneously in two molds (4, 4').

E. Method according to embodiment C, characterized in that the compacts (10), after the mold (4) has been removed from the press chamber (18), are removed from the openings (11) row by row and then refilled with ground material (12).

F. Method according to one or more of embodiments A to E, characterized in that the starting material for the ground material (12) is so comminuted that about 95% of the particles would pass through a screen with a mesh size of 15 mm.

G. Method according to one or more of embodiments A to F, characterized in that an addition of binding agents or other adhesively acting substances to the particles is performed in a mixer before they are charged into the mold (4).

H. Method according to one or more of embodiments A to G, characterized in that the charging of the ground material (12) into the mold (4) is performed from above, while a vacuum is applied from below through supply lines (13) into the openings (11) in the mold (4).

I. Method according to one or more of embodiments A to H, characterized in that, during the compaction, steam is introduced from below into the openings (11) of the mold (4), with the interposition if necessary of a screen (8).

J. Method according to one or more of embodiments A to I, characterized by an after-drying of the compacts (10) to a moisture under 12% in a dryer.

K. Method according to embodiment F, characterized in that the comminution of the starting material for the ground material (12) is performed in mills, refiners or in double-screw defibering mills.

L. Method according to one or more of embodiments A to K, characterized by the treatment of the starting material according to Example "A," according to which the ground material (12) are adjusted by steaming before they are compacted, to a moisture of less than 20%, preferably 10%, but more than 5 weight-percent, and adjusted to a temperature above 90° C., and the compaction is performed in a heated mold (4).

M. Method according to embodiment L, characterized in that the steaming of the starting material is performed in a mixer.

N. Method according to embodiments L and M, characterized in that, when starting material with a moisture above 20% is used, a drying to moisture contents under 20%, preferably 10%, is performed in a drum dryer or electric dryer.

O. Method according to embodiments L to N, characterized in that the mold (4) is preheated before being charged with the ground material (12).

P. Method according to embodiments L to O, characterized in that, during or at the start of the compaction, steam is introduced into the openings (11) in the mold (4).

Q. Method according to one or more of embodiments A to K, characterized by the treatment of the starting material according to Example "B," according to which, to the dried starting material with a moisture content below 20%, there is added a binding agent and/or agglomeration agent in a small percentage, the ground material (12) thus prepared are spread into the openings (11) of an unheated mold (4) and the compaction is performed at high pressure in an unheated multi-platen press (1).

R. Method according to embodiment Q, characterized in that the compaction is performed at a temperature of 10° C. to 50° C.

S. Method according to embodiments Q and R, characterized in that the starting material is steamed in a mixer prior to spreading.

T. Method according to one or more of embodiments A to K, characterized by the treatment of the starting material according to Example "C," according to which the moist or predried ground material (12) are spread into a mold (4) that has been heated above 100° C. and compacted in a heated multi-platen press (1) whose ram (3) and press table (2) are heated at 100° C. to 270° C., hot or conditioned hot air of 100° C. to 200° C. is introduced before or at the start of the compaction into the openings (11) of the mold (4), and the compaction ends when the compacts (10) have a moisture content less than 15%, preferably 6%.

U. Method according to embodiment T, characterized in that, in the use of a starting material with a moisture content above 120%, it is pressed out mechanically to a moisture content of 30% to 60%.

V. Method according to embodiments T and U, characterized in that the mold (4) is-heated to a temperature above 150° C. before the ground material (12) are heated.

AA. Apparatus for the practice of the method according to embodiments A to V, consisting of a filling system (9) and a multi-platen press (1) between which an inserting and removing device for a mold (4) is disposed, the mold (4) has many openings (11) to receive the ground material (12) and the multi-platen press (1) includes a press table (2) arranged therein, and a ram (3) which can be raised and lowered by means of hydraulic piston-and-cylinder systems (5, 6), and plungers (7) are provided on the ram (3) for all openings (11) in the mold (4).

BB. Multi-platen press for the apparatus according to embodiment AA, characterized in that at the margin of the ram (3) a lowering and raising apparatus (14) is provided for raising the mold (4) to the ram (4) and lowering it.

CC. Multi-platen press according to embodiments AA and BB, characterized, in that a conduit (13) is disposed at each opening (11) for connecting a vacuum apparatus or for feeding steam to the mold (4).

DD. Multi-platen press according to embodiments AA to CC, characterized in that the diameters of the conduits (13) and openings (11) are approximately equal in size.

EE. Multi-platen press according to embodiments AA to DD, characterized in that between the mold (4) and the press table (2) a screen (8) is provided.

FF. Multi-platen press according to embodiments AA to EE, characterized in that the mold (4) has a thickness of about 150 mm and the openings (11) a diameter of 4 to 12 mm.

GG. Apparatus according to embodiment AA, characterized in that two molds (4 and 4') are provided, while the removal of the compacts (10) from the openings (11) and the refilling of the latter with ground material (12) is to be performed alternately, i.e., once left and once right at each opening.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. Method for the manufacture of compacts from comminuted material for burning in hearths, wherein ground material is put into openings of a mold and compressed therein to form compacts, comprising:

filling a mold with the ground material and compacting the ground material into compacts in a press chamber of a multi-platen press by plunging plungers into the openings of the mold, and after the compaction, raising the mold with a ram, and additionally lifting up the mold against the ram, while ejecting finished compacts from the press chamber into a container.

2. Method according to claim 1, wherein the openings of the mold are filled with ground material outside of the multi-platen press and then the mold is moved into the press chamber.

3. Method for the manufacture of compacts from comminuted material for burning in hearths, wherein ground material is put into openings of a mold and compressed therein to form compacts, comprising:

filling the openings of the mold with ground material;

compacting the ground material to compacts in a chamber of a multi-platen press by plunging plungers into many openings of the mold;

after the compaction, lifting the plungers out of the mold with a ram and carrying the mold out of the press chamber, forcing the compacts out of the openings and, after the mold is refilled for a next compaction cycle, carrying the mold into the press chamber.

4. Method according to claims 1 to any of 3, wherein the compaction of the ground material in the multi-platen press, and the ejection of the compacts as well as the refilling, are performed simultaneously in respective molds.

5. Method according to claim 3, wherein the compacts, after the mold has been removed from the press chamber, are removed from the openings row by row and then refilled with ground material.

6. Method according to claim 1, wherein a starting material for the ground material is so comminuted that about 95% of the ground material particles would pass through a screen with a mesh size of 15 mm.

7. Method according to claim 1, wherein binding agents or other adhesively acting substances are added to the ground material in a mixer before the ground material is charged into the mold.

8. Method according to claim 1, wherein the ground material is charged into the mold from above, while a vacuum is applied from below through supply lines into the openings in the mold.

9. Method according to claim 1, wherein during the compaction, steam is introduced from below into the openings of the mold, with the interposition of a screen.

10. Method according to claim 1, further comprising drying the compacts to a moisture under 12% in a dryer.

11. Method according to claim 6, furthering comprising comminuting the starting material for the ground material in mills, refiners or in double-screw defibering mills.

12. Method according to claims 1 or 3, including, before compaction, adjusting the ground material by steaming to a moisture of less than 20%, but more than 5 weight-percent, and to a temperature above 90° C., and wherein the compaction is performed in a heated mold.

13. Method according to claim 12, the steaming of the starting material is performed in a mixer.

14. Method according to claim 12, further comprising, when starting material with a moisture above 20% is used, drying the starting material to moisture content under 20%, in a drum dryer or electric dryer.

15. Method according to claim 12, wherein the mold is preheated before being charged with the ground material.

16. Method according to claim 12, further comprising, during or at the start of the compaction, introducing steam into the openings in the mold.

17. Method according to claims 1 or 3, including adding, to dried starting material with a moisture content below 20%, binding agent and/or agglomeration agent, the ground material thus prepared being spread into the openings of an unheated mold and the compaction being performed at high pressure in an unheated multi-platen press.

18. Method according to claim 17, wherein the compaction is performed at a temperature of 10° C. to 50° C.

19. Method according to claim 17, wherein the starting material is steamed in a mixer prior to spreading.

20. Method according to claims 1 or 3, including spreading moist or predried ground material into a mold that has been heated above 100° C., compacting the ground material in a heated multi-platen press whose ram and press table are heated at 100° C. to 270° C., introducing hot or conditioned hot air of 100° C. to 200° C. before or at the start of the compaction into the openings of the mold, and ending the compaction when the compacts have a moisture content less than 15%.

21. Method according to claim 20, wherein in the use of a starting material with a moisture content above 120%, the starting material is pressed out mechanically to a moisture content of 30% to 60%.

22. Method according to claim 20, further comprising heating the mold to a temperature above 150° C. before the ground material is heated.

23. Apparatus for manufacturing compacts from comminuted material, comprising:

a filling system and a multi-platen press between which an inserting and removing device for a mold is disposed, the mold having a plurality of through openings to receive ground material, and the multi-platen press including a press table arranged therein, and a ram adapted to be raised and lowered, plungers being provided on the ram for the through openings in the mold.

24. Multi-platen press for the apparatus according to claim 23, further comprising a lowering and raising apparatus adapted to raise the mold to the ram.

25. Multi-platen press according to claim 23, further comprising conduits disposed at respective openings adapted to connect a vacuum apparatus or to feed steam to the mold.

26. Multi-platen press according to claim 25, wherein diameters of the conduits and the openings are approximately equal in size.

27. Multi-platen press according to claim 23, further comprising a screen disposed between the mold and the press table.

28. Multi-platen press according to claim 23, wherein the mold has a thickness of about 150 mm and the openings a diameter of 4 to 12 mm.

29. Apparatus according to claim 23, wherein two molds are provided and adapted for alternate removal of the compacts from the openings and refilling of the openings with the ground material.

* * * * *